(12) United States Patent
Ryder et al.

(10) Patent No.: US 8,141,653 B2
(45) Date of Patent: Mar. 27, 2012

(54) FOLDING IMPLEMENT FRAME

(75) Inventors: Nicholas George Alfred Ryder, Saskatoon (CA); Darwin Zacharias, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/478,570

(22) Filed: Jun. 4, 2009

(65) Prior Publication Data

US 2010/0307779 A1 Dec. 9, 2010

(51) Int. Cl.
*A01B 49/00* (2006.01)
(52) U.S. Cl. .......................................... 172/311
(58) Field of Classification Search .................. 172/311, 172/452, 468, 776
See application file for complete search history.

(56) References Cited

U.S. PATENT DOCUMENTS

| | | | |
|---|---|---|---|
| 359,478 A | 3/1887 | Van Tassel | |
| 3,548,954 A * | 12/1970 | Lindemann | 172/311 |
| 3,841,412 A * | 10/1974 | Sosalla | 172/311 |
| 3,935,907 A | 2/1976 | Riet | |
| 3,990,521 A | 11/1976 | Ankenman et al. | |
| 4,121,852 A | 10/1978 | Quanbeck | |
| 4,128,131 A * | 12/1978 | Bucher et al. | 172/311 |
| 4,133,391 A * | 1/1979 | Richardson et al. | 172/311 |
| 4,171,022 A * | 10/1979 | Applequist | 172/311 |
| 4,191,260 A * | 3/1980 | Klindworth | 172/311 |
| 4,286,672 A * | 9/1981 | Forsyth et al. | 172/311 |
| 4,360,215 A * | 11/1982 | Nohl et al. | 280/413 |
| 4,402,367 A * | 9/1983 | Couser | 172/456 |
| 4,467,875 A | 8/1984 | Lewison | |
| 4,632,417 A | 12/1986 | Hodapp | |
| 4,653,592 A | 3/1987 | Friggstad | |
| 4,721,168 A | 1/1988 | Kinzenbaw | |
| 6,223,831 B1 * | 5/2001 | Friggstad | 172/311 |
| 6,550,543 B1 * | 4/2003 | Friggstad | 172/311 |
| 2010/0025056 A1 * | 2/2010 | Friggstad | 172/452 |

* cited by examiner

*Primary Examiner* — Thomas Will
*Assistant Examiner* — Joel F. Mitchell
(74) *Attorney, Agent, or Firm* — Rebecca Henkel

(57) ABSTRACT

In an embodiment, an agricultural implement includes a first wing tool bar and a second wing tool bar on each lateral side of the implement. The first wing tool bar and the second wing tool bar are configured to rotate from a working position to a transport position. The first wing tool bar and the second wing tool bar each include a respective tool frame configured to rotate upwardly from a working position to a transport position. In addition, the second wing tool bar is configured to articulate with respect to the first wing tool bar during transport. A fold-away frame section is rotatably coupled to the first wing tool frame and configured to rotate out of a plane formed by the first and second wing tool frames to avoid contact between the tool frames during transport.

19 Claims, 4 Drawing Sheets

FOLDING IMPLEMENT FRAME

BACKGROUND

The invention relates generally to a folding implement frame, and more specifically, to a fold-away frame section configured to facilitate frame articulation in a transport position.

A range of agricultural implements have been developed and are presently in use for tilling, planting, harvesting, and so forth. Seeders, for example, are commonly towed behind tractors and may cover wide swaths of ground which may be tilled or untilled. Such devices typically open the soil, dispense seeds in the soil opening, and re-close the soil in a single operation. In seeders, seeds are commonly dispensed from bulk seed tanks and distributed to row units by a distribution system. To make the planting operation as efficient as possible, very wide swaths of ground may be covered by extending wings on either side of a central boom section of the implement pulled by the tractor. Included in the wing assemblies are generally tool bars, tool frames, row units, and support wheels. Certain wing assemblies are configured to fold rearwardly or forwardly for transport. In such configurations, tool frames coupled to each wing assembly may first fold upwardly about respective tool bars. The wing assemblies may then fold rearwardly or forwardly. This arrangement provides a compact profile for transport. Unfortunately, in the transport position, the tool frames of each wing assembly may be positioned directly adjacent to one another. Therefore, articulation of the tool bars during transport may cause contact between the tool frames, thereby potentially damaging components of the implement. Consequently, it may be desirable to provide an implement geometry configured to establish a gap between tool frames such that contact between components is avoided during transport.

BRIEF DESCRIPTION

Embodiments of the present disclosure enables articulation of implement wings during transport while avoiding contact between the respective wings. Specifically, in certain embodiments, an agricultural implement includes a first wing tool bar and a second wing tool bar on each lateral side of the implement. The first wing tool bar and the second wing tool bar are configured to rotate from a working position to a transport position. The first wing tool bar and the second wing tool bar each include a respective tool frame configured to rotate upwardly from a working position to a transport position. In addition, the second wing tool bar is configured to articulate with respect to the first wing tool bar during transport. A fold-away frame section is rotatably coupled to the first wing tool frame and configured to rotate out of a plane formed by the first and second wing tool frames to avoid contact between the tool frames during transport.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
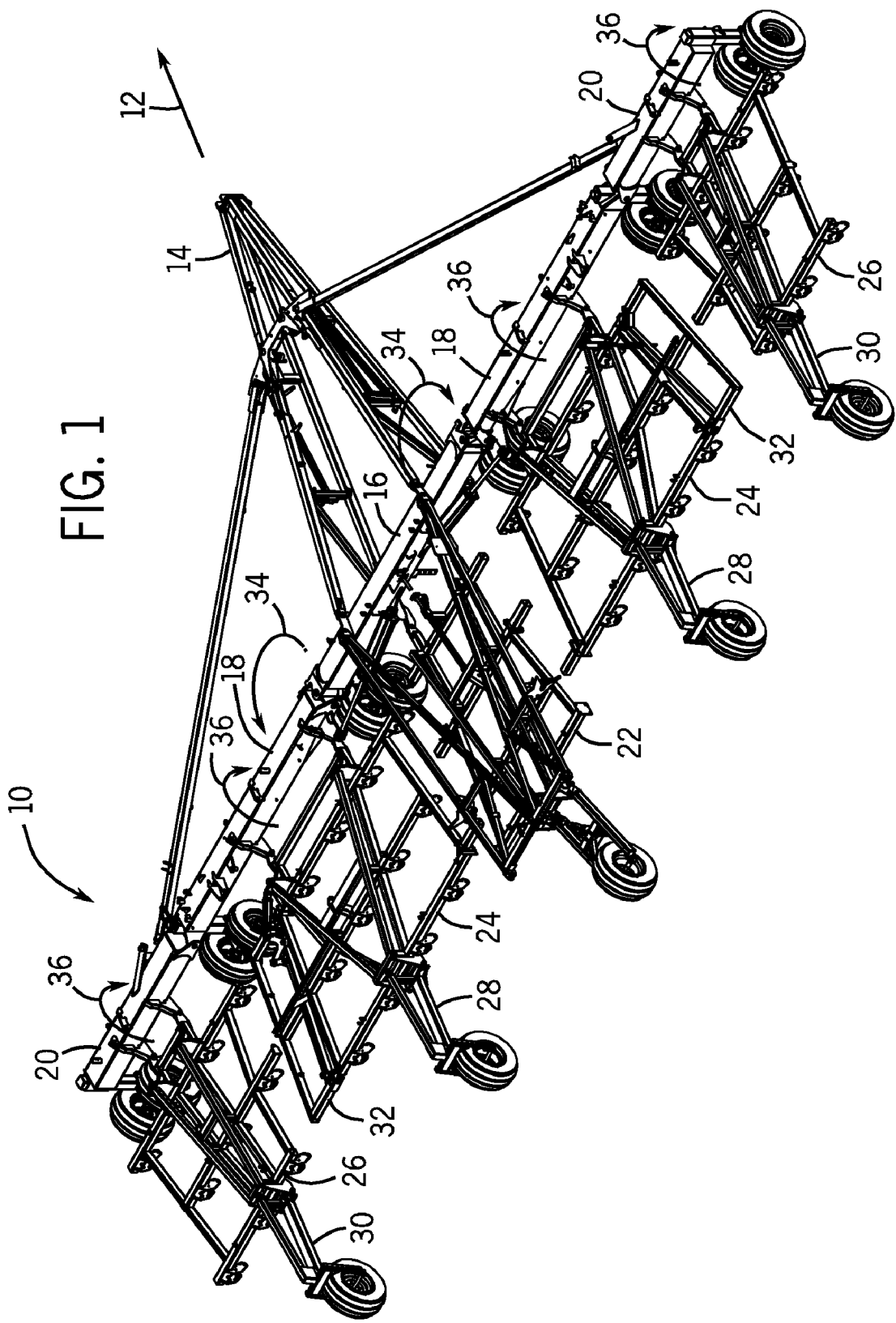
FIG. 1 is a perspective view of a folding implement in a working position.

Turning now to the figures, FIG. 1 is a perspective view of a folding implement 10 in a working position. While the illustrated implement 10 is a seeder, alternative implements such as planters, harvesters, or tillers may be employed in further embodiments. The implement 10 is designed to be towed behind a work vehicle such as a tractor along a direction of travel 12. The implement 10 includes a tow bar assembly 14 which is shown in the form of an A-frame hitch assembly. The tow bar assembly 14 may include a hitch used to attach to an appropriate tractor hitch via a ball, clevis, or other coupling. The tow bar assembly 14 is coupled to a central tool bar 16, and two first wing tool bars 18 are each coupled to an end of the central tool bar 16. In addition, a second wing tool bar 20 is coupled to each first wing tool bar 18. As illustrated, both the first wing tool bars 18 and the second wing tool bars 20 are substantially aligned with the longitudinal axis of the central tool bar 16. In other words, each tool bar 16, 18 and 20 is positioned perpendicular to the tow bar assembly 14. In alternative embodiments, the central tool bar 16 may be omitted, and the first wing tool bars 18 may be coupled directly to the tow bar assembly 14. As discussed in detail below, both the first wing tool bars 18 and the second wing tool bars 20 may be rotated rearwardly or forwardly for transport.

In the present embodiment, a central tool frame 22 is coupled to the central tool bar 16, first wing tool frames 24 are coupled to respective first wing tool bars 18, and second wing tool frames 26 are coupled to respective second wing tool bars 20. In many applications, row units will be coupled to each of the tool frames 22, 24 and 26 for depositing seeds into the soil, for example. In the illustrated working position, each first wing tool frame 24 is supported by a wheel assembly 28, while each second wing tool frame 26 is supported by a wheel assembly 30. In this configuration, towing the implement 10 in the direction 12 enables the row units to engage the soil, thereby depositing seeds into the soil.

As illustrated, a fold-away frame section 32 is coupled to each first wing tool frame 24. As discussed in detail below, the fold-away frame section 32 is configured to rotate out of a plane formed by the first wing tool frame 24 and the second wing tool frame 26 during transport, thereby enabling articulation of the second wing relative to the first wing while avoiding contact between respective tool frames. The implement 10 may transition from the illustrated working mode to a transport mode by folding the first and second wing tool bars 18 and 20 rearwardly in a direction 34 or forwardly, and folding the first and second wing tool frames 24 and 26 upwardly in a direction 36. Specifically, the first wing tool frames 24, including the fold-away frame sections 32, and the second wing tool frames 26 may be folded approximately 90 degrees upwardly in the direction 36. Next, the first wing tool bars 18 and the second wing tool bars 20 may be folded approximately 90 degrees rearwardly in the direction 34. In alternative embodiments, tool bars 18 and 20 may be folded approximately 90 degrees forwardly. Finally, the fold-away frame sections 32 may be rotated out of the plane formed by the first wing tool frames 24 and the second wing tool frames 26, thereby establishing a gap between each first wing tool frame 24 and the respective second wing tool frame 26. At that point, the implement 10 is configured for transportation.

Figure 2:
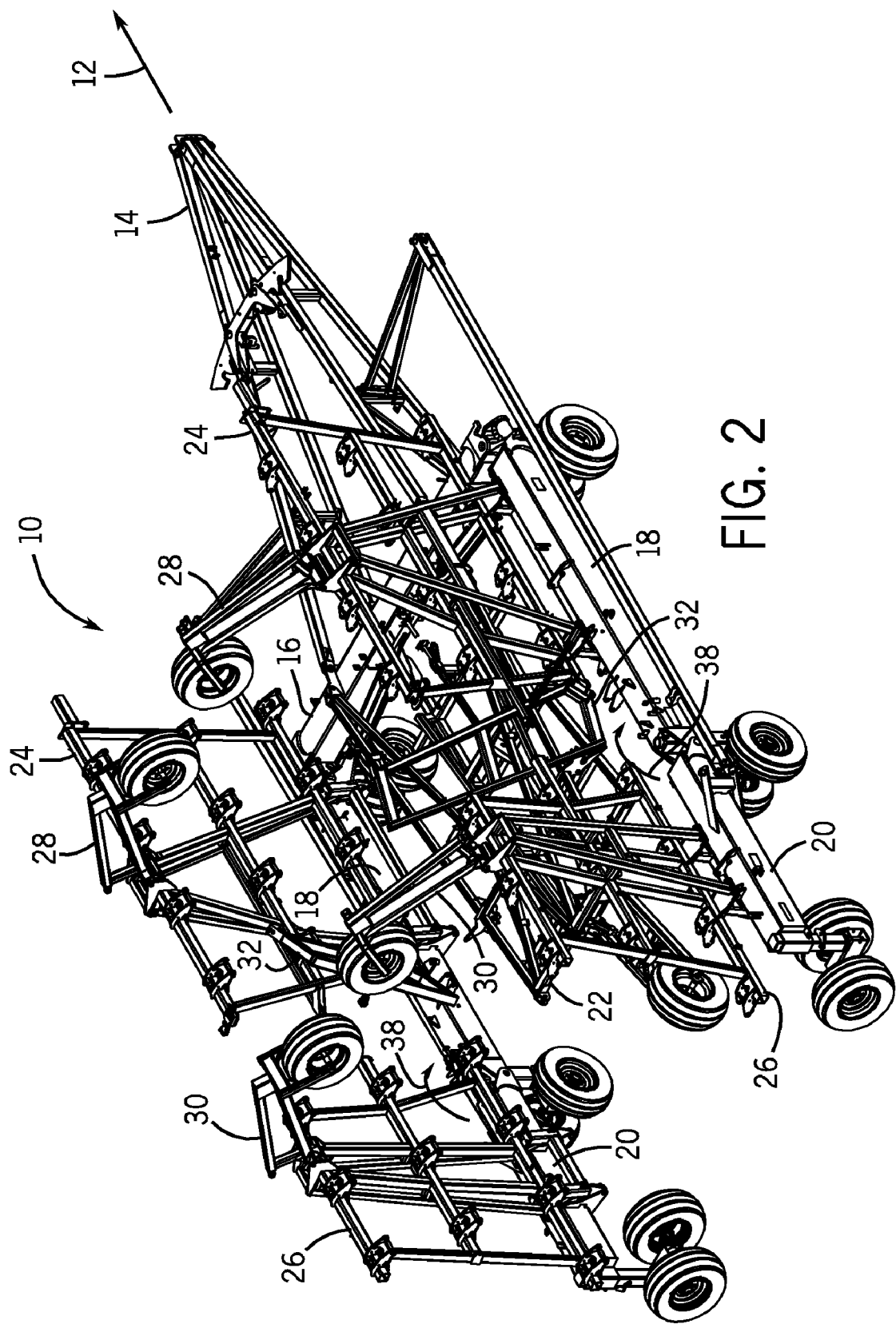
FIG. 2 is a perspective view of the folding implement, as shown in FIG. 1, in a transport position, including fold-away frame sections configured to avoid contact between tool frames during transport.

FIG. 2 is a perspective view of the implement 10, as shown in FIG. 1, in a transport position. As illustrated, the first wing tool bars 18 and the second wing tool bars 20 are rotated approximately 90 degrees rearwardly from their working position, and the first wing tool frames 24 and the second wing tool frames 26 are rotated approximately 90 degrees upwardly from their working position. In addition, the wheel assemblies 28 and 30 have rotated downwardly because the load associated with the tool frames 24 and 26 is borne by the tool bars 18 and 20 in the transport mode. This configuration of the implement 10 provides a compact profile suitable for transport.

Furthermore, as illustrated, the fold-away frame sections 32 have also moved into their transport position, i.e., rotated out of a plane formed by the first wing tool frame 24 and the second wing tool frame 26. In this configuration, a gap is formed between the first wing tool frame 24 and the second wing tool frame 26. This gap enables the second wing tool bar 20 to articulate with respect to the first wing tool bar 18 during transport. Specifically, if the implement 10 encounters a change in elevation or an obstruction as the implement 10 is being towed in the direction 12, the second wing tool bar 20 may rotate in a direction 38 relative to the first wing tool bar 18. As the second wing tool bar 20 rotates, the gap between the first wing tool frame 24 and the second wing tool frame 26 decreases. Therefore, a width of the fold-away frame section 32 may be configured such that the second wing tool bar 20 may articulate relative to the first wing tool bar 18, while avoiding contact between the respective tool frames 24 and 26.

Figure 3:
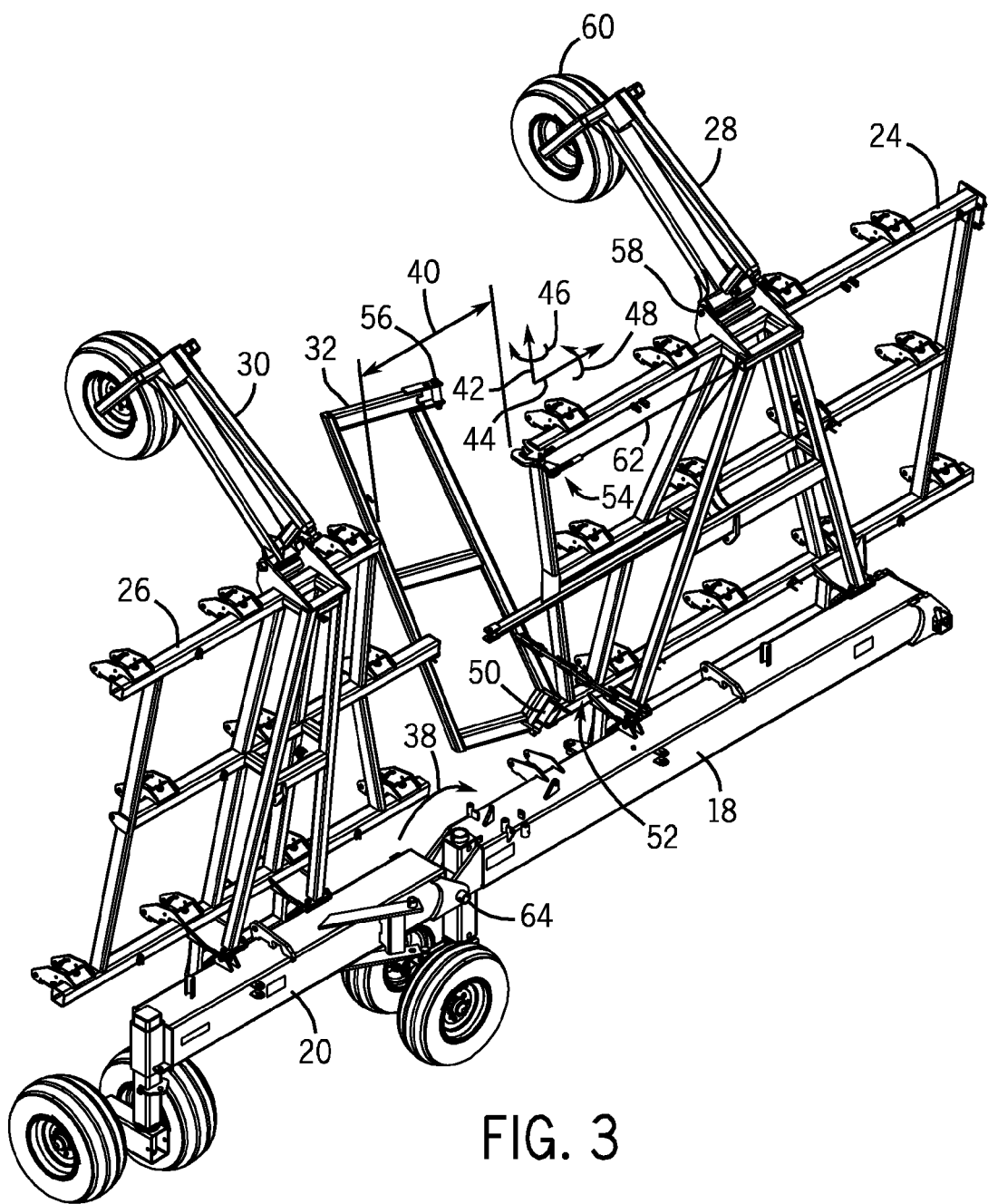
FIG. 3 is a perspective view of a first wing tool frame, a second wing tool frame and a fold-away frame section in the transport position, as shown in FIG. 2.

FIG. 3 is a perspective view of the first wing tool frame 24, the second wing tool frame 26 and the fold-away frame section 32 in the transport position. As illustrated, the fold-away frame section 32 has been rotated out of the plane formed by the first wing tool frame 24 and the second wing tool frame 26. With the fold-away frame section 32 in the transport position, a gap 40 is formed between the first wing tool frame 24 and the second wing tool frame 26. In the illustrated embodiment, the fold-away frame section 32 is configured to rotate about an axis inclined with respect to a vertical axis 42 and a horizontal axis 44. Specifically, the fold-away frame section 32 rotates in a direction 46 about the vertical axis 42 and a direction 48 about the horizontal axis 44 as the fold-away frame section 32 transitions from the working position to the transport position. In alternative embodiments, the degree of incline with respect to the vertical axis 42 and/or the horizontal axis 44 may be varied to alter the angle of the fold-away frame section 32 with respect to the tool frames 24 and 26. In further embodiments, the fold-away frame section 32 may be configured to only rotate about the vertical axis 42 in the direction 46.

The fold-away frame section 32 is pivotally coupled to the first wing tool frame 24 by a joint 50 configured to facilitate rotation about the axes 42 and 44. The joint 50 is also inclined with respect to the vertical axis 42 and the horizontal axis 44, thereby enabling the fold-away frame section 32 to rotate in the directions 46 and 48. In alternative embodiments, the fold-away frame section 32 may be pivotally coupled to the second wing tool frame 26, and configured to rotate in a similar manner. In the present embodiment, an actuator 52 is coupled to the first wing tool frame 24 and the fold-away frame section 32 to facilitate rotation of the fold-away frame section 32 about the joint 50. As discussed in detail below, the actuator 52 may include a linear hydraulic cylinder coupled to a framework configured to induce rotation of the fold-away frame section 32 about the joint 50. In this configuration, the fold-away frame section 32 may be rotated from the working position inline with the tool frames 24 and 26 to the illustrated transport position.

Furthermore, the first wing tool frame 24 includes a latching mechanism 54 configured to engage a corresponding latch 56 of the fold-away frame section 32. In addition to the actuator 52, the latching mechanism 54 may serve to secure the fold-away frame section 32 to the first wing tool frame 24 while the implement 10 is in the working mode. In this configuration, the row units coupled to the first wing tool frame 24 may engage the soil at substantially the same depth as the row units coupled to the fold-away frame section 32. As the implement 10 transitions from the working mode to the transport mode, the latching mechanism 54 may release the latch 56, thereby enabling the actuator 52 to rotate the fold-away frame section 32 from the working position to the transport position. For example, the latching mechanism 54 may release the latch 56 only after the first wing tool frame 24 has transitioned to the transport position. Alternatively, the latching mechanism 54 may release the latch 56 prior to rotation of the tool bars 18 and 20, and/or prior to rotation of the tool frames 24 and 26.

In the illustrated embodiment, the latching mechanism 54 is configured to release the latch 56 automatically as the first wing tool frame 24 rotates upwardly about the first wing tool bar 18. Specifically, the first wing wheel assembly 28 is coupled to a joint 58 configured to facilitate rotation of the wheel assembly 28 about the horizontal axis 44. When the implement 10 is in the working mode and the first wing tool frame 24 is in the downward position, the weight of the first wing tool frame 24 causes the wheel assembly 28 to rotate into the working position. As illustrated in FIG. 1, in the working position, a wheel 60 of the wheel assembly 28 contacts the ground and supports the tool frame 24. However, when the first wing tool frame 24 rotates upwardly, the weight of the wheel assembly 28 causes the wheel assembly 28 to rotate about the joint 58. In the present embodiment, a cable 62 couples the wheel assembly 28 to the latching mechanism 54. In this configuration, as the wheel assembly 28 rotates toward the transport position, the cable 62 is pulled, thereby releasing the latching mechanism 54 and enabling the fold-away frame section 32 to rotate toward the transport position. Conversely, because the latching mechanism 54 is biased toward the latched position, as the wheel 60 contacts the soil and the wheel assembly 28 rotates toward the working position, tension on the cable 62 is released, thereby engaging the latching mechanism 54. Therefore, the fold-away frame section 32 may be rotated to the working position prior to contact between the wheel 60 and the ground, thereby aligning the latch 56 with the latching mechanism 54 before the latching mechanism 54 is engaged. For example, in certain embodiments, the actuator 52 may operate on the same hydraulic circuit as the actuators that rotate the tool bars 18 and 20. In such embodiments, the fold-away frame section 32 may rotate toward the working position as the tool bars 18 and 20 rotate into alignment with the central tool bar 16. Once the latching mechanism 54 has engaged the latch 56, the fold-away frame section 32 becomes substantially rigidly coupled to the first wing tool frame 24.

As previously discussed, rotation of the fold-away frame section 32 out of the plane formed by the first wing tool frame 24 and the second wing tool frame 26 may enable articulation of the second wing tool bar 20 with respect to the first wing tool bar 18 during transport while avoiding contact between the tool frames 24 and 26. Specifically, the second wing tool bar 20 is rotatably coupled to the first wing tool bar 18 by a joint 64 configured to enable the second wing tool bar 20 to rotate in the direction 38 with respect to the first wing tool bar 18. Therefore, if the implement 10 encounters a change in elevation or an obstruction during transport, the second wing tool frame 26 may rotate about the joint 64 in the direction 38 toward the first wing tool frame 24. Consequently, the width of the fold-away frame section 32 along the horizontal axis 44 may be particularly configured such that the gap 40 provides sufficient clearance between the tool frames 24 and 26 during transport to facilitate articulation of the second wing tool bar 20.

Figure 4:
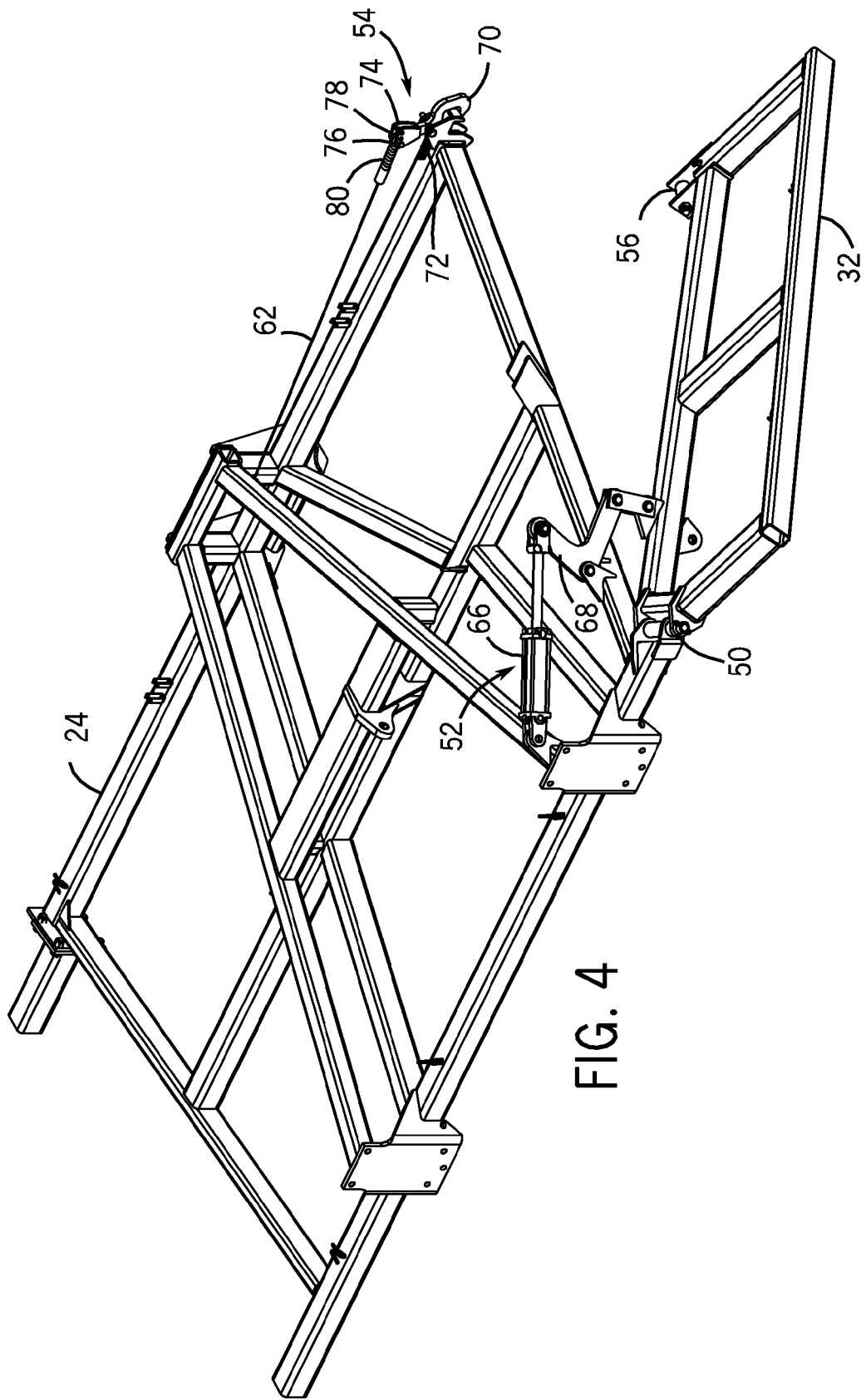
FIG. 4 is a detailed perspective view of the fold-away frame section in the transport position, as shown in FIG. 2.

FIG. 4 is a detailed perspective view of the first wing tool frame 24 and the fold-away frame section 32 in the transport position. As illustrated, the actuator 52 includes a linear actuator 66 and a pivoting framework 68. The framework 68 is configured to translate the linear motion of the actuator 66 into rotational motion about the joint 50. In the present embodiment, the linear actuator 66 is a hydraulic cylinder. However, as will be appreciated by those skilled in the art, the linear actuator 66 may be a pneumatic cylinder, an electromechanical actuator, or a screw drive, among other actuators, in alternative embodiments. Furthermore, in certain embodiments, the actuator 52 may be a rotary actuator (e.g., hydraulic, pneumatic, electromechanical, etc.) configured to rotate the fold-away frame section 32 directly.

FIG. 4 also provides a detailed perspective view of the latching mechanism 54. The latching mechanism 54 includes a hook 70, a biasing member 72, a frame 74, a pin 76, and adjustment openings 78. Specifically, the hook 70 is configured to engage the latch 56 when the fold-away frame section 32 is in the working position. In addition, the biasing member 72 is configured to bias the hook 70 toward the latched position. Therefore, when tension on the cable 62 is released as the wheel 60 contacts the ground, the biasing member 72 induces the hook 70 to engage the latch 56, thereby securing the fold-away frame section 32 to the first wing tool frame 24. In the present embodiment, the biasing member 72 is a tension spring coupled to the first wing tool frame 24 and configured to induce the hook 70 to capture the latch 56 when the first wing tool frame 24 and the fold-away frame section 32 are in the working position. The hook 70 is coupled to the frame 74 including multiple adjustment openings 78. The pin 76 is configured to be disposed within a pair of openings 78. Because the openings 78 are positioned in various locations within the frame 74, placement of the pin 76 may be selected to properly adjust the point at which the latching mechanism 54 disengages the latch 56 as the first wing tool frame 24 rotates upwardly. The pin 76 is coupled to the cable 62 by a spring 80. The spring 80 may facilitate slight movement of the cable 62 without disengaging the latching mechanism 54. Specifically, slight tension on the cable 62 may cause the spring 80 to expand without moving the frame 74 and hook 70. However, as additional tension is applied due to rotation of the wheel assembly 28, the cable 62 may rotate the frame 74 and hook 70 such that the latching mechanism 54 disengages the latch 56.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A towable agricultural implement, comprising:
   two first wing tool bars each having a first end and a second end, the first end being pivotally coupled to a tow bar assembly;
   two second wing tool bars each coupled to the second end of a respective first wing tool bar;
   two first wing tool frames each coupled to a respective first wing tool bar, wherein each first wing tool frame is configured to rotate upwardly from a working position to a transport position;
   two second wing tool frames each coupled to a respective second wing tool bar, wherein each second wing tool frame is configured to rotate upwardly from a working position to a transport position; and
   two fold-away frame sections each disposed between a respective first wing tool frame and a respective second wing tool frame, and oriented substantially within a plane of the respective first wing tool frame and the respective second wing tool frame while the first and second wing tool frames are in their respective working positions, wherein each first wing tool frame includes a first end proximal to the respective second wing tool frame, and a second end distal from the respective second wing tool frame, and wherein each fold-away frame section is rotatably coupled to the first end of the respective first wing tool frame and configured to rotate out of the plane to avoid contact between the respective first wing tool frame and the respective second wing tool frame during transport.

2. The towable agricultural implement of claim 1, wherein each fold-away frame section is rotatably coupled to the respective first wing tool frame by a joint configured to rotate each fold-away frame section about an axis inclined with respect to horizontal and vertical.

3. The towable agricultural implement of claim 1, comprising an actuator coupled to each fold-away frame section and configured to rotate the fold-away frame section out of the plane formed by the respective first and second wing tool frames.

4. The towable agricultural implement of claim 3, wherein the actuator comprises a linear actuator coupled to a pivoting framework.

5. The towable agricultural implement of claim 1, wherein the tow bar assembly comprises a transverse central tool bar, and the first end of each first wing tool bar is pivotally coupled to the transverse central tool bar of the tow bar assembly.

6. The towable agricultural implement of claim 1, wherein each first wing tool frame comprises a latching mechanism configured to engage a corresponding latch of the respective fold-away frame section, and secure the fold-away frame section to the respective first wing tool frame during operation of the towable agricultural implement.

7. The towable agricultural implement of claim 6, comprising a wheel assembly rotatably mounted to each first wing tool frame and including a wheel, wherein the latching mechanism is configured to engage the corresponding latch upon contact between the wheel and a surface.

8. The towable agricultural implement of claim 1, wherein each of the first wing tool frames, the second wing tool frames, and the fold-away frame sections are configured to support a plurality of row units.

9. A towable agricultural implement, comprising:
   a first wing tool bar configured to fold backwardly relative to a direction of travel;
   a first wing tool frame rotatably coupled to the first wing tool bar, and configured to support a plurality of row units and fold upwardly about a longitudinal axis of the first wing tool bar;
   a second wing tool bar positioned laterally outward from the first wing tool bar, and pivotally coupled to the first wing tool bar by a joint configured to facilitate articulation of the second wing tool bar relative to the first wing tool bar during transport;

a second wing tool frame rotatably coupled to the second wing tool bar, and configured to support a plurality of row units and fold upwardly about a longitudinal axis of the second wing tool bar; and a fold-away frame section disposed between the first wing tool frame and the second wing tool frame, and oriented substantially within a plane of the first wing tool frame and the second wing tool frame while the first and second wing tool frames are in a working position, wherein the fold-away frame section is configured to support a plurality of row units and to move prior to transport to form a gap between the first wing tool frame and the second wing tool frame;

wherein the first wing tool frame includes a first end proximal to the second wing tool frame, and a second end distal from the second wing tool frame, the fold-away frame section is pivotally coupled to the first end of the first wing tool frame, and the fold-away frame section is configured to rotate out of the plane during transport.

10. The towable agricultural implement of claim 9, wherein the fold-away frame section is configured to rotate about an axis inclined with respect to horizontal and vertical.

11. The towable agricultural implement of claim 9, wherein the fold-away frame section is driven to move by a hydraulic actuator.

12. The towable agricultural implement of claim 9, comprising a central frame configured to be towed in operation and support a plurality of row units, the central frame including a hitch assembly, wherein the first wing tool bar is pivotally coupled to the central frame.

13. The towable agricultural implement of claim 9, wherein the first wing tool frame comprises a latching mechanism configured to secure the fold-away frame section during operation and release the fold-away frame section during transport.

14. An agricultural implement, comprising:
a central tool bar including a central tool frame;
a first wing tool bar rotatably coupled to the central tool bar, and oriented substantially parallel to the central tool bar in a working mode and substantially perpendicular to the central tool bar in a direction away from a direction of travel in a transport mode;
a first wing tool frame rotatably coupled to the first wing tool bar, and oriented substantially parallel to the central tool frame in the working mode and substantially perpendicular to the central tool frame in an upward direction in the transport mode;

a second wing tool bar pivotally coupled to the first wing tool bar by a joint configured to facilitate articulation of the second wing tool bar relative to the first wing tool bar in the transport mode, and oriented substantially parallel to the central tool bar in the working mode and substantially perpendicular to the central tool bar in the direction away from the direction of travel in the transport mode;

a second wing tool frame rotatably coupled to the second wing tool bar, and oriented substantially parallel to the central tool frame in the working mode and substantially perpendicular to the central tool frame in an upward direction in the transport mode; and a fold-away frame section positioned between the first wing tool frame and the second wing tool frame in the working mode, wherein the first wing tool frame includes a first end proximal to the second wing tool frame, and a second end distal from the second wing tool frame, and wherein the fold-away frame section is rotatably coupled to the first end of the first wing tool frame and oriented substantially within a plane of the first wing tool frame and the second wing tool frame in the working mode, and oriented out of the plane of the first wing tool frame and the second wing tool frame in the transport mode.

15. The agricultural implement of claim 14, wherein the first wing tool frame comprises a latching mechanism configured to secure the fold-away frame section to the first wing tool frame in the working mode and release the fold-away frame section in the transport mode.

16. The agricultural implement of claim 14, comprising an actuator configured to substantially orient the fold-away frame section within the plane of the first wing tool frame and the second wing tool frame in the working mode, and orient the fold-away frame section out of the plane of the first wing tool frame and the second wing tool frame in the transport mode.

17. The agricultural implement of claim 14, wherein the fold-away frame section is rotatably coupled to the first wing tool frame by a joint configured to rotate the fold-away frame section about an axis inclined with respect to horizontal and vertical.

18. The agricultural implement of claim 14, wherein the central tool frame, the first wing tool frame, the second wing tool frame and the fold-away frame section are configured to support a plurality of row units.

19. The agricultural implement of claim 14, wherein the central tool bar comprises a hitch assembly, and wherein the agricultural implement is configured to be towed by the hitch assembly.

* * * * *